US005643992A

United States Patent [19]

Northey

[11] Patent Number: 5,643,992
[45] Date of Patent: Jul. 1, 1997

[54] COATING ADDITIVES FOR WATER-BASED FORMULATIONS

[75] Inventor: Paul J. Northey, Somerset, Wis.

[73] Assignee: Minnesota Mining and Manufacturing Company, St. Paul, Minn.

[21] Appl. No.: 458,430

[22] Filed: Jun. 2, 1995

[51] Int. Cl.$^6$ .................................................. C08L 7/02
[52] U.S. Cl. .................. 524/501; 524/376; 524/377; 524/378; 524/555; 524/557; 524/558
[58] Field of Search ........................... 524/501, 377, 524/378, 376, 555, 557, 558

[56] References Cited

U.S. PATENT DOCUMENTS

| Re. 33,008 | 8/1989 | Ruffner et al. | 524/555 |
|---|---|---|---|
| 3,878,152 | 4/1975 | Distler et al. | 260/3 |
| 3,944,100 | 3/1976 | Brockway et al. | 525/218 |
| 4,335,036 | 6/1982 | Fowell | 524/377 |
| 4,379,095 | 4/1983 | Oldack | 524/377 |
| 4,507,413 | 3/1985 | Thoma et al. | 525/131 |
| 4,542,182 | 9/1985 | Schuppiser et al. | 524/377 |
| 4,904,715 | 2/1990 | Hunter et al. | 524/377 |
| 5,006,586 | 4/1991 | Touji et al. | 524/377 |
| 5,108,782 | 4/1992 | Reed | 524/366 |
| 5,179,158 | 1/1993 | Azuma et al. | 526/214 |
| 5,196,246 | 3/1993 | Kauss et al. | 428/343 |
| 5,319,020 | 6/1994 | Rosenski et al. | 524/377 |
| 5,342,883 | 8/1994 | Jenkins et al. | 524/842 |
| 5,395,879 | 3/1995 | Murray | 524/377 |
| 5,412,021 | 5/1995 | Nakanishi | 524/377 |
| 5,424,122 | 6/1995 | Crandall et al. | 524/377 |
| 5,459,184 | 10/1995 | Bunnelle et al. | 524/377 |

FOREIGN PATENT DOCUMENTS

| 0053931 | 6/1982 | European Pat. Off. |
| 0179628 | 4/1986 | European Pat. Off. |
| 0294027 | 12/1988 | European Pat. Off. |
| 0575625 | 12/1992 | European Pat. Off. |
| 59-047212 | 3/1984 | Japan |
| 59-210982 | 11/1984 | Japan |

OTHER PUBLICATIONS

Glass, "Dynamics of Roll Splatter and Tracking", *J. Coatings Tech.*, vol. 50, No. 641, pp. 56–71 (1978).

"POLYOX Water Soluble Resins", Union Carbide Product Literature, 1991/1992.

D. Satas, *Handbook of Pressure–Sensitive Adhesive Technology*, Chapter 13, VanNostrand Reinhold Company (1982).

Soules et al., "Dynamic Uniaxial Extensional Viscosity", Chapter 20, pp. 322–332 in *Polymers as Rheology Modifiers*, D.N. Schultz and J.E. Glass eds. in American Chemical Society Symposium series No. 462 (1991).

Soules et al., "Dynamic Uniaxial Extensional Viscosity (DUEV) Effects in Roll Application", *Journal of Rheology*, 32 (2), 181–198 (1988).

*Primary Examiner*—Paul R. Michl
*Assistant Examiner*—Olga Asinovsky
*Attorney, Agent, or Firm*—Gary L. Griswold; Walter N. Kirn; Charles D. Levine

[57] ABSTRACT

A water-based pressure sensitive adhesive formulation is provided with one or more high molecular weight linear aliphatic polymers. The resulting composition can be used to form stable filaments or delivered from the coating die of a premetered coater in the form of a stable sheet at a flow rate substantially less than the minimum delivery flow rate achievable using the formulation without polymer. Low levels of polymer can provide dramatic improvement in the viscosity of such compositions, without detrimental effect on the adhesive and other desireable qualities of the composition.

17 Claims, No Drawings they must also, however, have suitable viscosity at low shear rates so as not to sag on vertical surfaces while permitting leveling of coating defects.

COATING ADDITIVES FOR WATER-BASED FORMULATIONS

TECHNICAL FIELD

The present invention relates to the use of rheology modifiers for adjusting the viscosity of water-based formulations. In a further aspect, the invention relates to modifiers such as poly(ethylene oxide) resins for adjusting the viscosity of aqueous systems.

In another aspect, the present invention relates to premetered coating techniques for coating substrates with thin films of compositions such as latex adhesives.

BACKGROUND OF THE INVENTION

Rheology Modifiers.

Rheology modifiers are useful for adjusting liquid shear viscosity as a function of shear rate. Latex paints, for example, must have suitable viscosity at high shear rates to give correct coverage and brush drag. They must also, however, have suitable viscosity at low shear rates so as not to sag on vertical surfaces while permitting leveling of coating defects.

The adjustment of viscosity in water-borne latex paints is often accomplished by the addition of such materials as alkali swellable thickeners, lower molecular weight associative thickeners, water soluble polymers, and the like.

See also Soules, et al. "Dynamic Uniaxial Extensional Viscosity", Chapter 20, pp 322–332 in *Polymers as Rheology Modifiers*, D. N. Schulz and J. E. Glass eds., in American Chemical Society Symposium Series #462 (1991), which describes the use of additives to affect various rheological properties of water-borne latex paint coatings, and Soules, et al. *J. Rheology* 32(2): 181–198 ( 1988) which describes the use of fillers, including poly(oxyethylene), to affect the extensional viscosity of formulations for spray applications.

Two types of water-based rheology modifiers are commonly used to increase shear viscosity, and are often referred to as "thickeners". The first type includes alkali-activated copolymers of acrylic or methacrylic acid monomer and alkyl (meth)acrylates or butyl acrylate monomer. Thickening is achieved when initially acidic solutions are neutralized to pH greater than about 6.5 and the acid groups become soluble, causing swelling and interaction of the polymer chains.

The second type of thickeners, referred to as associative thickeners, are becoming increasingly popular in the paint industry for providing desired "brush drag" and leveling properties. These thickeners are similar to the alkali-activated copolymers, but include a grafted nonionic surfactant to provide physical intermolecular crosslinks.

Commercial HMW PEO resins are said to be extremely effective thickening agents in both fresh and salt water. The aqueous solutions are described as pseudoplastic (i.e., "shear thinning"). (See, e.g., "POLYOX Water Soluble Resins", Union Carbide Product literature, 12 pgs., 1991, 1992)

Glass, "Dynamics of Roll Spatter and Tracking", *J. Coatings Tech.* 50(641):56–71 (1978) describes the addition of water soluble polymers, including high molecular weight poly(ethylene oxide) polymers, to latex paint in order to study their effect on such properties as spatter and tracking patterns.

Others have described the use of high or low molecular weight epoxide polymers in water-based systems. See, for example, U.S. Pat. No. 3,944,100 (Brockway, et at.) which describes a "containment" coating composition for glass containers, the composition including the optional use of 100–800 ppm PEO, which can be added for shear enhancement.

U.S. Pat. No. 4,507,413 (Thoma et at.) describes a spreadable polyurethane reactive coating composition for coating textile sheet products and the like. The patent describes the optional use of substances for thickening the spread coating viscosity of an aqueous dispersion of blocked isocyanate prepolymer. Included in the group of thickening substances are water soluble polymers, including long chain polyethylene oxides.

Schuppiser et al., in U.S. Pat. No. 4,542,182 describe the use of ethylene glycol polymer having low molecular weights (MW of between 1,000 and 50,000) for preparing lattices of particles of vinyl acetate olefin copolymers. The lattices, in turn, are applied as binders in the manufacture of paints, and other materials.

U.S. Pat. No. 5,108,782 to Reed describes a silicone release coating emulsion that includes the use of a water soluble or water dispersible polymeric thickening agent such as high molecular weight PEO. The silicone emulsion is said to exhibit improved holdout of the silicone from the substrate.

U.S. Pat. No. 5,342,883 (Jenkins, et al.) discloses the use of water soluble polymers formed from alpha, beta-monoethylenically unsaturated monomers. The polymers are either soluble in or swelled by an aqueous alkaline medium. When added to latex paints and neutralized, both the viscosity of the paint and brush drag are said to be increased.

High molecular weight polymers such as poly(ethylene oxides) have not previously been used or described as useful for improving the rheological properties of materials such as water-based pressure sensitive adhesives.

Adhesive Coating Techniques.

Premetered liquid coaters include those in which the flow rate of the coating material is controlled before its application to a substrate. Such coaters, which include slot coaters, slide coaters, and curtain coaters, can be used to deliver thin sheets of materials such as adhesives to a substrate. In each situation, a fluid is fed to a coating die, and in turn is applied to a substrate in the form of a stable sheet (also known as a "bead" in the context of slot coating).

With other (e.g., postmetered) coating techniques, such as dip coaters and roll coaters, the amount of fluid applied to the substrate depends on the fluid properties themselves, such as fluid viscosity and surface tension, as well as on the operating conditions such as substrate speed and coating gap.

Typically a premetered coater provides a coating die for the delivery of material, and provides for a physical gap between the die and substrate. With slot and slide coaters, the gap is generally more than 100 microns (about 4 mils) in distance, while with curtain coaters the gap can be on the order of centimeters.

The combination of flow rate per unit width and substrate speed together determine the thickness of the delivered sheet, and in turn of the coating itself. In order to obtain thinner coatings, it is often more desirable to decrease the flow rate rather than increase the substrate speed, since the latter is generally more prone to problems with flow stability and drying limitations. The ability to decrease flow rate, however, is generally limited by the rheological properties of the coating composition itself. Lowering a flow rate too much will result in the application of non-uniform or unstable sheets.

Since coating thickness is also known to correlate with the size of the coating gap between the die and substrate, there is a strong tendency in the extrusion coating industry to use very tight gaps to produce very thin coatings. However gaps under about 100 microns frequently result in operating difficulties, since particulate matter that accumulates in the coating gap can cause streaks. Tight gaps also make it easy for large particles or taped splices in the substrate to tear the substrate (e.g., web). As a result, most conventional slot coating processes continue to rely on gaps greater than about 50 microns.

Pressure-sensitive adhesive latexes are typically thickened for best handling on coating equipment. The shear thickeners typically used have included cellulosic thickeners, poly(vinyl alcohol) and aqueous solutions of alkali soluble acrylic emulsions. (See, e.g., D. Satas, Chapter 13, *Handbook of Pressure-Sensitive Adhesive Technology*, VanNostrand Reinhold (1982).

It is clear that the industry has a need for methods for improving the coatability of pressure-sensitive adhesive formulations, and in particular, for decreasing the flow rate, or increasing the coating gap in the course of premetered coating.

SUMMARY OF THE INVENTION

The present invention provides a coating composition comprising a water-based pressure sensitive adhesive formulation, and one or more high molecular weight polymers. The polymer is present at a total concentration suitable to allow the composition to be delivered from the coating die of a premetered coater in the form of a stable sheet at a flow rate substantially less than the minimum delivery flow rate achievable using the formulation without polymer.

Applicant has found that surprisingly low levels of polymer can provide dramatic improvement in the viscosity of such compositions, without detrimental effect on the adhesive and other desirable qualities of the composition.

In one embodiment, the composition of the present invention permits the use of a minimum flow rate that is less than about 70%, and more preferably less than about 50% of the minimum flow rate necessary to maintain a stable sheet of the formulation without added polymer, under comparable opening conditions.

In addition to affecting the flow rate, the present invention permits the coating gap distances typically used to be increased by two or more times. The ability to use a significantly wider gap to provide an equally thin coating carries significant advantages in the processing of such materials.

In one embodiment, the coated material is a pressure-sensitive adhesive ("PSA") formulation such as a latex, acrylate-based PSA. Also, the high molecular weight polymer can be a linear aliphatic polymer, such as a high molecular weight ("HMW") poly(ethylene oxide) ("PEO") polymers. In another embodiment the composition comprises a water-based latex pressure sensitive adhesive and between about 1 ppm and about 50 ppm of a high molecular weight PEO.

In another aspect, the invention provides a method of preparing a coating composition. The method comprises the steps of forming a water-based pressure sensitive adhesive formulation, and adding, during or after formation of the formulation, a high molecular weight polymer. The polymer is added to a final concentration suitable to allow the composition to be delivered from the coating die of a premetered coater in the form of a stable sheet at a flow rate substantially less than the minimum delivery flow rate achievable using the formulation itself. In one embodiment, the polymer is added to achieve a final concentration of between about 1 ppm and about 50 ppm, based on the weight of the composition.

In yet other aspects, the invention provides a coating composition prepared by the method of the invention, as well as a coating composition preamble by the method of the invention. In further aspects, the invention provides a coating delivered using a composition of the invention, and a coated product comprising such a coating.

DETAILED DESCRIPTION

Unless otherwise apparent, the following words and phrases shah have the following meanings.

"Formulation" will refer to a water-based material, e.g., pressure-sensitive adhesive, capable of being provided in coated form on a desired substrate, as by conventional liquid coating techniques.

"Composition" will refer to a formulation in combination with one or more high molecular weight polymers, according to the teaching of the present invention.

"Water-based" will refer to a formulation prepared in aqueous form and including a suspension of pressure-sensitive adhesive. The adhesive suspension can be in any suitable form, including a colloidal emulsion (i.e., "latex") or a suspension of adhesive microspheres.

"Pressure sensitive adhesive" will refer to a viscoelastic material which in solvent-free form remains permanently tacky. Generally, such a material will adhere instantly to most solid surfaces with the application of slight pressure.

"Coating" will be used interchangeably with "coatable" and other inflections of the word to refer to the ability of a composition to be delivered in the form of a thin film to a substrate (e.g., a web).

"Viscosity" will refer to both elongational (also known as extensional) viscosity and shear viscosity. Shear viscosity involves a fluid flow determination in which the velocity component varies only in a plane normal to its direction. Elongational viscosity involves a fluid flow determination in which the velocity component varies only in its own coordinate direction.

"Spinnability" will refer to the ability to pull a liquid formulation or composition into the form of a stable filament.

"Stable sheet" will refer to a flat liquid film capable of being formed and delivered from a coating die in a continuous form to a substrate.

"Flow rate" will refer to the volumetric flow of liquid per unit time and width, as expressed in terms of cc/cm-sec.

The present invention provides water-based coating compositions that include the addition of high molecular weight polymers to stabilize liquid sheets or films in coating applications. The use of such polymers significantly increases the useful range of stable operating parameters such as substrate speed, coating gap, and liquid flow rate.

Applicant has discovered these and other benefits of the use of HMW polymer additives in curtain and slot coating applications. The relationship between the coating thickness, T, the substrate speed, S, and the flow rate per unit width, Q, is given by the formula:

$$Q = T \times S$$

For liquids typically used in curtain coating, the minimum flow rate to maintain a stable curtain is generally on the order of about 0.5 cc/cm-sec. (See, e.g., E. B. Gutoff, Chapter 4, "Premetered Coating", pp. 117–167, E. D. Cohen and E. B. Gutoff, eds. *Modern Coating and Drying Technology* (1992). Above this rate, voids that might form in the curtain propagate upstream with a velocity lower than that of the falling liquid, and the defect is swept away. For a 25 μm coating thickness, S =200 cm/sec (120 m/min) for liquids commonly used in curtain coating, which in some cases is too fast given drying limitations. Reduction of the minimum flow rate with the addition of HMW polymer allows lower coating speeds and longer oven residence times.

Applicant has found PEO to be an effective additive for curtain and slot coating latex adhesives, particularly when used with formulations having a pH of about 7 or less. Using 8,000,000 MW PEO, for instance, improved coatability was observed at levels from 2 to 20 parts per million. The effect was shown to disappear after several days, but could be reestablished by the addition of more PEO. Off-line, stable sheets can be achieved using PEO-thickened latex at flow rates on the order of ten times lower than for unthickened PSA formulations.

Such a large effect makes it possible to tailor water-based formulations for curtain coating at speeds of 10–300 m/min and thicknesses as low as 10 microns. Likewise, slot coating of water-based liquids is made possible at process conditions previously unattainable.

Coating Formulations

Descriptions and examples of acrylic adhesives suitable for use in the present invention are provided in Chapter 13 "Acrylic Adhesives", Donald Satas, in *Handbook of Pressure-Sensitive Adhesive Technology*, Van Nostrand Reinhold Company, the disclosure of which is incorporated herein by reference. Such adhesives can be prepared from monomers that include acrylate, diacrylate, triacrylate, methacrylate, dimethacrylate, trimethacrylate, tetramethacrylate, acrylamide, and the like.

In one embodiment, the composition of the invention includes a pressure-sensitive adhesive, particularly polyvinyl PSA's of the type described in U.S. Pat. No. Re 24,996. Included in these PSA's are the polymers of the acrylate esters of acrylic acid with non-tertiary alkyl alcohols such as n-butanol, n-pentanol, isopentanol, 2-methyl butanol, 1-methyl butanol, 2-methyl pentanol, 3-methyl pentanol, 2-ethyl butanol, pentanol-3, 3, 5, 5-trimethylhexanol, heptanol-3, isooctanol, n-decanol, dodecanol, and the like, as well as various copolymers.

In one embodiment, preferred PSA formulations generally comprise a blend of materials that include an acrylate (or methacrylate) copolymer having an inherent viscosity greater than about 0.2 dl/g. The copolymer comprises polymerized primary monomers and optionally polar comonomer. The primary monomer component comprises at least one free radically polymerizable vinyl monomer which is an acrylic or methacrylic acid ester of a non-tertiary alcohol having from 1 to 18 carbon atoms with the average number of carbon atoms being about 4–12. The polar monomer component is copolymerizable with the primary monomer and the amount by weight of polar monomer is up to about 30% of the total weight of all the monomers in the copolymer. Suitable formulations of this type are described, for instance, in U.S. Pat. No. 4,737,577 (Brown), the disclosure of which is incorporated herein by reference.

Other monomers may also be included in the formulation, including for instance, up to about 150 parts by weight of a compatible tackifying resin per 100 parts by weight copolymer, and up to about 50 parts by weight of a compatible plasticizer per 100 parts by weight of copolymer.

Suitable latex PSA formulations for use in the present invention typically include from about 30% to about 60% solids, and preferably about 40% to about 55% solids, by weight, based on the weight of the formulation.

Coating formulations can be provided in other forms as well, including in the form of adhesive microspheres. Suitable microspheres include those described in co-pending PCT application WO 94/13751, ("Tacky Microspheres Having Pendant Hydrophilic Polymeric or Oligomeric Moieties", filed 9 Dec. 1993 as International application no. PCT/US93/11967), the disclosure of which is incorporated herein by reference.

High Molecular Weight Polymers

Suitable high molecular weight polymers for use in forming compositions of the present invention include ethylene oxide polymers and copolymers as described, for instance in "1,2 Epoxide Polymers", pp. 337–343 in *Concise Encyclopedia of Polymer Science and Engineering*, J. Kroschwitz, ed. J. Wiley & Sons, 1990. Preferred HMW polymers provide an optimal combination of such properties as flexibility, low glass transition temperature ("Tg"), water solubility. Preferred HMW polymers also have a molecular weight of at least about 100,000 g/mole, preferably at least about 1,000,000 g/mole, and most preferably at least about 5,000,000 g/mole.

Examples of preferred HMW polymers include those known as poly(ethylene oxide) polymers having the repeating unit —(CH2—CH2—O)n— and available commercially under the trademark POLYOX. The commercial product is a free-flowing white powder in molecular weight grades ranging from about $1 \times 10^5$ to $5 \times 10^6$. Such polymers are nonionic, high molecular weight (from 100,000 to about 8,000,000) water-soluble poly(ethylene oxide) polymers.

HMW PEO is preferred since it provides an inexpensive additive for modifying the rheology of latex adhesives for curtain and extrusion coating. Applicant has found that it is effective at extremely low levels, provides improved spinnability ("higher cohesive strength") in the latex, has relatively low glass transition temperature (Tg), and provides reasonable adhesive properties.

Preparation of Coating Compositions

Formulations of the present invention can be made using conventional mixing techniques. Since PEO polymers are generally provided in the form of a powder, various manufacturers suggest that the powder first be prepared in the form of a concentrated stock solution. A suitable aliquot can be withdrawn from a stock solution and added to a PSA formulation in order to quickly, reproducibly, and effectively form a composition of the invention. The stock solution, in turn, provides greater long term stability than the final composition.

In view of the present teaching those skilled in the art will appreciate the manner in which various parameters can be modified within the scope of the present invention. Such parameters include the relative and final latex and polymer concentrations, the polymer molecular weight, formulation pH, and shelf stability.

As described above, PSA concentrations will typically be used at a solids concentration of about 30% to about 60% solids, by weight of the formulation. At these preferred PSA concentrations, high molecular weight polymer can be incorporated into a formulation in any suitable manner, e.g., during or after the preparation of the PSA formulation. For use in slot coating applications, one or more high molecular weight polymers are preferably present in a total concentration of between about 1 ppm to about 50 ppm, and preferably between about 2 ppm and about 20 ppm, based on the weight of the final composition. For slot coating microsphere PSA compositions, the high molecular weight polymer is present in a total concentration of between about 10 ppm and about 1000 ppm, and preferably between about 100 ppm and about 500 ppm.

For use in curtain coating applications, the high molecular weight polymer is preferably present at a concentration of between about 10 ppm and about 100 ppm, more preferably between about 20 ppm and about 70 ppm, and most preferably between about 30 ppm and about 60 ppm. Generally, lower concentrations of PSA solids are associated with higher HMW polymer concentrations.

It appears that the pH of the PSA formulation is an important factor in assuring the effectiveness of polymer. Generally, the pH should be neutral to slightly acidic. pH values of on the order of pH 2 to pH 7 are suitable, with pH values of between about pH 4 and pH 6 being preferred.

It also appears that the desired effects of polymer on the PSA formulation are transient in nature, generally decreasing over the course of storage over a week. As described in the EXAMPLES, the effect can be re-established in the same manner that is was initially established, i.e., by the addition of polymer in the manner described herein.

Use of Coating Compositions

The invention provides a water-based coating composition that includes the use of high molecular weight polymer to provide stabilization of liquid sheets or filaments in coating applications. Compositions of the present invention can be used in a variety of coating techniques, including curtain coating and slot (i.e., extrusion) coating, of latex and microsphere-PSA materials. See, "Premetered Coating", Chapter 4, pp. 117–167 in *Modern Coating and Drying Technology*, E. Cohen and E. Gutoff, eds.

A composition of the present invention can be delivered from the coating die of a premetered coater in the form of a stable sheet or filament at a flow rate substantially less than the minimum delivery flow rate achievable using the formulation itself.

The flow rate of a PSA formulation can be determined using the same coater and techniques as that of the comparable PSA/polymer composition. Under these conditions, the minimum flow rate at which the PSA can be delivered in the form of a stable sheet or filament will be compared with the minimum flow rate of the composition capable of reproducibly producing a stable sheet or filament.

Curtain and slot coating.

The use of a composition of the present invention significantly increases the useful range of premetered coater operating parameters such as substrate speed, coating gap, and liquid flow rate.

Curtain coating offers several advantages over other die coating methods including: easy splice passage, ability to use nonuniform die-to-substrate gaps, and an exposed slot for easy cleaning. However, one major drawback has been the relatively high flow rate required to maintain a stable curtain using many coating liquids.

When used in curtain coating processes, for instance, the compositions of the present invention provide significantly improved "spinnability." See, generally, C. Petrie and M. Denn, "Instabilities in Polymer Processing", AIChE Journal 22(2):209–235 (1976), the disclosure of which is incorporated herein by reference. Improved spinnability of curtain coated compositions, in turn, permits desirable changes to be made in processing parameters. Such changes include, for instance, the ability to use a lower flow rate and a lower final coating weight for a given substrate speed, or a lower substrate speed for a given final coating weight.

Such spinnable liquids can also maintain stable curtains at flow rates as low as about 0.05 cc/sec-cm of curtain width, as compared to flow rates of on the order of 0.5 to 1 cc/sec-cm for PSA formulations without PEO. Significant effect can in some cases be achieved by as little as 5 parts per million. Such low levels produce little effect on the adhesion properties of the final dried film, and little effect on low shear rate (i.e. leveling) characteristics of the liquid.

When coated in a conventional slot coating process, conventional latex adhesive formulations typically require a coating gap of on the order of 75 microns to 100 microns to achieve a 50 micron coating thickness. By comparison, compositions of the present invention can achieve a similar coating thickness using a coating gap of on the order of 250 micron to 500 micron or higher.

The method and composition of the present invention can also be used to improve the coatability of compositions containing adhesive microspheres. Such microspheres are typically formed of materials intended for use as pressure sensitive adhesives, and include the materials described in co-pending application WO 94/13751, ("Tacky Microspheres Having Pendant Hydrophilic Polymeric or Oligomeric Moieties", filed 9 Dec. 1993 as International application no. PCT/US93/11967), the disclosure of which is incorporated herein by reference.

Filament formation.

Such compositions can also be used to form PSA filaments, which can be used to form and coat webs. See, for instance, "Fibers, Manufacture". pp. 389–392 in *Concise Encyclopedia of Polymer Science and Engineering*, J. Kroschwitz, ed. J. Wiley & Sons, 1990, the disclosure of which is incorporated herein by reference.

Generally, filaments can be prepared using spinning processes such as dry spinning techniques in which a polymer solution is extruded from a spinneret through a zone in which the solvent is rapidly evaporated leaving filaments that are wound up at speeds up to about 1000 m/min. Wet spinning techniques are useful as well, wherein a polymer solution is extruded from a spinneret into a nonsolvent that coagulates (i.e., precipitates) the polymer to form filaments.

These and other examples of the invention are illustrated by the following examples which should not be viewed as limiting in scope.

EXAMPLES

TEST METHODS

Peel adhesion test

The peel adhesion properties of coated materials was determined according to American Society for Testing and Materials Test Method ASTM D3330-90 using glass as the test substrate. Diacetone alcohol and 2-propanol were used to clean the glass plate. A small test piece (½inch by 6–8 inches) was prepared and applied. The coating was then rolled down with a 4.5 pound roller, and evaluated immediately at either 31 cm/minute or 230 cm/minute.

Shear test

Shear was determined using an adhesive piece (approx. 1.3 cm×1.3 cm), hung with a 1000 gram load from a stainless steel plate. A piece was applied to a cleaned stainless steel plate, rolled down with a 4.5 pound roller (six passes) and evaluated in a conventional shear station. Shear tests were generally performed at both room temperature and 70 degrees C. Results are reported in minutes, determined at the point the adhesive separated completely from the plate.

Probe tack.

The tack of sheets coated with a composition or formulation described herein was measured with a Polyken Probe Tack tester (available from Kendall Company) according to American Society for Testing and Materials Test Method ASTM D2979-88. Compositions were coated onto 10 mil paper, yielding the dried coating thickness described in the EXAMPLES. After cleaning the probe with ethyl acetate using a lint-free cloth, a 2 cm×2 cm sample of the coated sheet was placed on the annular ring weight of the apparatus. For latex formulations/compositions, the tack was then measured and recorded using a 10 mm stainless steel probe having an area of 1 square centimeter with a speed of 1 cm/sec and a dwell time of 1 second.

Example 1

Latex PSA "A"—Effect of PEO (25 ppm, 52ppm)

Latex A was obtained in the form of a polyacrylic latex PSA. A stock solution of 4000 parts per million ("ppm") PEO (based on the weight of the solution) was prepared using 8,000,000 molecular weight poly(ethylene oxide), obtained from Aldrich Chemical Co. (catalogue number 37,283-8). The stock solution was prepared by slowing adding PEO powder to water while stirring with a magnetic stir bar. Following complete addition of the PEO, the composition was continuously stirred until the PEO had completely dissolved, generally within one to four hours. Aliquots of the stock PEO solution were then added to the latex formulations, during continuous mixing, in amounts sufficient to provide 25 and 52 ppm PEO, respectively, based on total composition weight. Mixing was continued up to 10 minutes following the last addition of PEO.

In order to determine the shear viscosity of a sample, a twelve milliliter sample was loaded into the cup of a rotational rheometer (Bohlin VOR) and shear viscosity data were taken at increasing shear rate and 25 degrees centigrade for the latex with and without addition of PEO. The results are provided in TABLE 1. A 200 milliliter sample was loaded into the breaker of an opposed nozzle device (Rheometics RFX) and apparent elongational viscosity data were taken at increasing elongation rate and 20 to 24 degrees centigrade for latex with and without 52 ppm PEO.

TABLE 1

| Strain Rate (sec$^{-1}$) | Latex A 55% PSA - shear viscosity | Latex A 55% PSA - elongational viscosity | 52 ppm 8 × 10$^6$ PEO - shear | 52 ppm 8 × 10$^6$ PEO - elogational |
|---|---|---|---|---|
| 1.2 | 1000 | 48000 | 820 | 16600 |
| 1.8 | 730 | | 600 | |
| 2.9 | 530 | 28500 | 440 | 11300 |
| 4.6 | 400 | | 330 | |

TABLE 1-continued

| Strain Rate (sec$^{-1}$) | Latex A 55% PSA - shear viscosity | Latex A 55% PSA - elongational viscosity | 52 ppm 8 × 10$^6$ PEO - shear | 52 ppm 8 × 10$^6$ PEO - elogational |
|---|---|---|---|---|
| 7.3 | 300 | 20000 | 250 | 10100 |
| 12 | 230 | | 210 | |
| 19 | 170 | 10900 | 150 | 10600 |
| 29 | 130 | | 150 | |
| 46 | 110 | 5040 | 780 | 16600 |
| 73 | 92 | | 660 | |
| 120 | 78 | 2300 | 520 | 21800 |
| 190 | 67 | | 430 | |
| 290 | 59 | 1100 | 370 | 14100 |
| 460 | 53 | | 350 | |
| 730 | 48 | | | |
| 920 | 44 | | | |

Both the shear and elongational viscosities for the compositions show sudden and significant increase after 46 sec-1 strain rate. In stark contrast, the latex formulation without PEO shows only decreasing viscosities with increasing stain rate. The strain rate at which the viscosity increased and the magnitude of increase correlated directly with the degree of spinnability observed, i.e. more spinnable compositions show larger viscosity increase at a lower strain rate.

TABLE 2 shows adhesion data for the latex PSA with and without addition of 25 ppm PEO. Coatings were applied by hand by pulling a polyester substrate under a fixed rigid knife with 50 micron gap at slow and moderate speed of roughly 2 and 10 cm/sec after 0 and 2 days from preparation of the composition. The coatings produced from the latex PSA/PEO compositions produced at 2 cm/sec were more uniform in thickness than those produced at 10 cm/sec.

TABLE 2

| Coating speed (cm/sec) | Time from mix to coat (days) | PEO (ppm) | Peel Adhesion 31 cm/mi (g/cm) | Peel Adhesion 230 cm/min (g/cm) | Shears RT (mins) | | Probe Tack (g) |
|---|---|---|---|---|---|---|---|
| | | | | | | avg | |
| 10 | 0 | 0 | 320 | 530 | 68/64/68 | 73 | 672 |
| 2 | 0 | 25 | 300 | 460 | 79/107/79 | 88 | 619 |
| 10 | 0 | 25 | 240 | 470 | 67/39/45 | 50 | 505 |
| 10 | 2 | 0 | 260 | 450 | 104/61/63 | 76 | 680 |
| 2 | 2 | 25 | 280 | 470 | 109/120/69 | 99 | 573 |
| 10 | 2 | 25 | 260 | 460 | 78/75/143 | 99 | 443 |

It can be seen that in each case there was little or no difference in overall performance between compositions with PEO and the original latex formulations. In other words, the benefits of the present invention, in terms of coating operating conditions, can be achieved without detrimental effect on the performance of the final coated composition.

Example 2

Latex "B"—Effect of PEO (20 ppm)

A PSA copolymer identified herein as "Latex B" was prepared using the general method described for the preparation of the control copolymer in Example 41 of U.S. Pat. No. 4,737,577, the disclosure of which is incorporated herein by reference. In particular, the principal copolymer was isooctylacrylate (IOA)/acrylic acid (AA) polymerized in a waterborne (emulsion) system.

A 5000 ppm PEO stock solution was prepared in the manner described in EXAMPLE 1, and diluted to 500 ppm PEO with water. An aliquot of the 500 ppm solution was then added to the latex formulation using the method described in EXAMPLE 1 in an amount sufficient to provide a final concentration of 20 ppm PEO.

Shear and elongational viscosities versus strain rate were determined for the latex with and without addition of PEO. Increased viscosities were observed at 29 sec-1 strain rate for the composition wherein PSA formulations showed only decreasing viscosities with increasing strain rate.

Example 3

PSA Microspheres—Effect of PEO

Latex microspheres were prepared according to the method described in co-pending application WO 94/13751, ("Tacky Microspheres Having Pendant Hydrophilic Polymeric or Oligomeric Moieties", filed 9 Dec. 1993 as International application no. PCT/US93/11967) the disclosure of which is incorporated herein by reference.

A 4000 ppm PEO stock solution was prepared as described in EXAMPLE 1, and was added to the microsphere PSA suspension using the method described in EXAMPLE 1 in an amount sufficient to give 650 ppm PEO. Shear viscosity data for microsphere compositions and formulations showed that the shear viscosity for the composition with PEO was larger than the formulation without PEO at all shear rates. For the composition, viscosity increased with shear rate past 2 sec-1. TABLE 3 gives adhesion data for a microsphere suspensions with 300 and 500 ppm PEO slot coated to give 40 micron dry coating.

TABLE 3

Adhesion properties of PEO thickened microsphere PSA.

| PEO concentration (ppm) | Probe Tack | Peel Test (230 cm/min) (g/cm) | Shear Test (2.54 cm (1 in.) wide, 1 kg) |
| --- | --- | --- | --- |
| 0 | 400–600 | 190–225 | >7000 min |
| 300 | 870 | 183 | >7000 min |
| 500 | 927 | 177 | >7000 min |

As with the other latex systems, the data in TABLE 3 demonstrates that there is little or no detrimental effect, and at times some apparent improvement of the overall functional properties of the coatings that result from compositions of the invention.

Example 4

Effect of PEO Concentration

Compositions of latex A and 8,000,000 MW PEO were prepared as described in EXAMPLE 1 in concentrations of 0, 5, 12, 25 and 52 ppm PEO by weight. TABLE 4 shows shear viscosities for each composition, it can be seen that increasing the concentration of PEO surprisingly resulted in a sharp increase in viscosity, and also surprisingly, that the sharp increase occurred at a lower shear rate with increasing concentration.

TABLE 4

| Strain Rate (sec$^{-1}$) | Latex A 55% PSA - shear viscosity | 52 ppm $8 \times 10^6$ PEO - shear | 25 ppm $8 \times 10^6$ PEO - shear | 12 ppm $8 \times 10^6$ PEO - shear | 5 ppm $8 \times 10^6$ PEO - shear |
| --- | --- | --- | --- | --- | --- |
| 1.2 | 1000 | 820 | 880 | 930 | 850 |
| 1.8 | 730 | 600 | 630 | 670 | 620 |
| 2.9 | 530 | 440 | 460 | 500 | 450 |
| 4.6 | 400 | 330 | 350 | 380 | 340 |
| 7.3 | 300 | 250 | 260 | 280 | 250 |
| 12 | 230 | 210 | 200 | 220 | 220 |
| 19 | 170 | 150 | 140 | 140 | 150 |
| 29 | 130 | 150 | 120 | 120 | 120 |
| 46 | 110 | 780 | 99 | 100 | 100 |
| 73 | 92 | 660 | 83 | 86 | 86 |
| 120 | 78 | 520 | 77 | 72 | 73 |
| 190 | 67 | 430 | 180 | 62 | 62 |
| 290 | 59 | 370 | 160 | 67 | 55 |
| 460 | 53 | 350 | 140 | 74 | 53 |
| 730 | 48 | | 110 | 66 | 51 |
| 920 | 44 | | | | 49 |

Example 5

Effect of PEO Molecular Weight

Compositions of latex A and 52 ppm PEO were prepared as described in EXAMPLE 1 using 8,000,000 and 1,000,000 MW PEO. TABLE 5 shows shear viscosities for each composition and for latex without PEO wherein the 8,000,000 MW PEO composition shows a larger increase in viscosity at 46 sec-1, and the 1,000,000 MW PEO composition shows a smaller increase in viscosity at 460 sec-1. Spinnability was also observed to increase with increased PEO molecular weight.

TABLE 5

| Strain Rate (sec$^{-1}$) | Latex A 55% PSA - shear viscosity | 52 ppm $8 \times 10^6$ PEO - shear | 52 ppm $1 \times 10^6$ PEO - shear |
| --- | --- | --- | --- |
| 1.2 | 1000 | 820 | 760 |
| 1.8 | 730 | 600 | 550 |
| 2.9 | 530 | 440 | 400 |
| 4.6 | 400 | 330 | 300 |
| 7.3 | 300 | 250 | 230 |
| 12 | 230 | 210 | 190 |
| 19 | 170 | 150 | 140 |
| 29 | 130 | 150 | 110 |
| 46 | 110 | 780 | 97 |
| 73 | 92 | 660 | 81 |
| 120 | 78 | 520 | 68 |

TABLE 5-continued

| Strain Rate (sec$^{-1}$) | Latex A 55% PSA - shear viscosity | 52 ppm 8 × 10$^6$ PEO - shear | 52 ppm 1 × 10$^6$ PEO - shear |
|---|---|---|---|
| 190 | 67 | 430 | 58 |
| 290 | 59 | 370 | 51 |
| 460 | 53 | 350 | 85 |
| 730 | 48 |  | 95 |
| 920 | 44 |  | 91 |

Example 6

Effect of PSA Particle Weight

Compositions of 25 ppm 8,000,000 MW PEO and latex A with particle weight fractions of 50 and 55 percent were prepared as described in EXAMPLE 1. TABLE 6 shows shear viscosities for these compositions and for corresponding latexes without PEO wherein sudden increase in shear viscosity is observed at 190 sec-1 for the 55 percent solids latex at 290 sec-1 for the 50 percent solids latex. Spinnability was also observed to increase with increased latex particle weight fraction.

TABLE 6

| Strain Rate (sec$^{-1}$) | Latex A 55% PSA - shear viscosity | 25 ppm 8 × 10$^6$ - shear | 50% PSA - shear | 50% PSA + 25 ppm 8 × 10$^6$ PEO - shear |
|---|---|---|---|---|
| 1.2 | 1000 | 880 |  |  |
| 1.8 | 750 | 630 |  |  |
| 2.9 | 530 | 460 |  |  |
| 4.6 | 400 | 350 |  |  |
| 7.3 | 300 | 260 |  |  |
| 12 | 230 | 200 |  |  |
| 19 | 170 | 140 | 34 | 42 |
| 29 | 130 | 120 | 33 | 39 |
| 46 | 110 | 99 | 30 | 35 |
| 73 | 92 | 83 | 27 | 30 |
| 120 | 78 | 77 | 24 | 26 |
| 190 | 67 | 180 | 22 | 89 |
| 290 | 59 | 160 | 19 | 100 |
| 460 | 53 | 140 | 18 | 83 |
| 730 | 48 | 110 | 17 | 72 |
| 920 | 44 |  | 16 |  |

Example 7

Effect of pH

The latex A formulation described in EXAMPLE 1 was brought to pH 8.5 by the slow addition of 10 percent NH4OH solution. Upon addition of 100 ppm 8,000,000 MW PEO using the method described in EXAMPLE 1, the composition showed no increase in spinnability. Furthermore, a 100 ppm 8,000,000 MW PEO composition prepared as described in EXAMPLE 1 at pH 5.5 losses its spinnability upon addition of NH4OH to pH 8.5, but regained its spinnability upon addition of dilute HCl sufficient to bring the pH below 7.

Example 8

Effect of Time on Spinnability

A composition of latex A and 50 ppm 8,000,000 MW PEO was prepared as described in EXAMPLE 1, and shear viscosity was determined at times of 10 minutes, 5 hours, 20 hours, 48 hours and 72 hours as shown in TABLE 7. The shear rate for onset of viscosity increase is shown to increase with time. Spinnability was observed to decrease in time after 5 hours.

TABLE 7

| Strain Rate (sec$^{-1}$) | 50 ppm PEO 10 min. from mix-shear | 50 ppm PEO 5 hrs. from mix-shear | 50 ppm PEO 20 hrs. from mix-shear | 50 ppm PEO 72 hrs. from mix-shear |
|---|---|---|---|---|
| 1.2 | 1080 | 1170 | 1120 | 910 |
| 1.8 | 690 | 740 | 780 | 680 |
| 2.9 | 490 | 520 | 560 | 510 |
| 4.6 | 360 | 380 | 410 | 370 |
| 7.3 | 270 | 280 | 310 | 270 |
| 12 | 220 | 230 | 250 | 220 |
| 19 | 160 | 170 | 180 | 160 |
| 29 | 140 | 150 | 150 | 120 |
| 46 | 630 | 710 | 120 | 100 |
| 73 | 670 | 700 | 100 | 83 |
| 120 | 520 | 550 | 440 | 69 |
| 190 | 410 | 440 | 390 | 58 |
| 290 | 340 | 370 | 340 | 67 |
| 460 | 310 | 320 | 280 | 150 |
| 730 |  |  |  | 240 |
| 920 |  |  |  | 140 |

Example 9

Replenishing Aged Compositions

The latex/PEO composition aged 72 hours as described in EXAMPLE 8 was combined with a stock solution of 4000 ppm 8,000,000 MW PEO in water as described in EXAMPLE 1 in amount sufficient to bring the total PEO concentration to 80 ppm. Viscosity was measured 10 minutes after the latter addition of the PEO and is shown in TABLE 8 along with viscosities for the initial and aged compositions. The onset value for increase in shear viscosity returns to the pre-aged value, and spinnability was observed return to its preaged magnitude upon addition of the PEO to the aged composition.

TABLE 8

| Strain Rate ($sec^{-1}$) | 50 ppm PEO 10 min. from mix-shear | 50 ppm PEO 72 hrs. from mix-shear | Rethickened to 80 ppm PEO from 50 ppm PEO after 72 hours |
|---|---|---|---|
| 1.2 | 1080 | 910 | 1180 |
| 1.8 | 690 | 680 | 830 |
| 2.9 | 490 | 510 | 600 |
| 4.6 | 360 | 370 | 450 |
| 7.3 | 270 | 270 | 340 |
| 12 | 220 | 220 | 270 |
| 19 | 160 | 160 | 210 |
| 29 | 140 | 120 | 220 |
| 46 | 630 | 100 | 900 |
| 73 | 670 | 83 | 840 |
| 120 | 520 | 69 | 730 |
| 190 | 410 | 58 | 620 |
| 290 | 340 | 67 | 520 |
| 460 | 310 | 150 | |
| 730 | | 140 | |
| 920 | | | |

Example 10

Curtain Coating Compositions

Compositions of latex PSA and 8,000,000 MW PEO at concentrations of 0, 25, 50 and 70 ppm were prepared as described in EXAMPLE 1, and were fed to a curtain coating die with tangential approach of liquid to substrate. For each composition, the liquid flow rate was initially set at a value sufficient to form a continuous liquid sheet between the die on top, the substrate on the bottom, and edge guides on the sides which were separated by 5 cm at the top and 3 cm at the bottom. The liquid flow rate was then slowly decreased until the sheet broke forming discontinuous droplets or filaments. TABLE 9 shows the minimum flow rate that could be maintained for each liquid before the sheet broke. Addition of 25 ppm PEO to the latex allowed a four fold decrease in minimum flow rate; addition of 50 ppm PEO allowed a six fold decrease in minimum flow rate; and addition of 70 ppm PEO allowed an eight fold decrease in minimum flow rate. For the compositions of latex and PEO, TABLE 9 also shows the maximum substrate speed attainable at the minimum liquid flow rate wherein the maximum substrate speed increases from 10 to 20 to 30 meters per minute for 25, 50 and 70 ppm PEO, respectively.

TABLE 9

Minimum flow rates and maximum coating speeds for curtain coating

| PEO concentration (ppm) | Minimum Flow Rate (cc/cm-sec) | Maximum Coating Speed (m/min) |
|---|---|---|
| 0 | 0.67 | -not tested- |
| 25 | 0.16 | 10 |
| 50 | 0.11 | 20 |
| 70 | 0.08 | 30 |

Example 11

Filament Forming-Web Coating

A composition of latex B and 10 ppm 8,000,000 MW PEO was prepared as described in EXAMPLE 2, and this composition was pumped to a bench top filament-forming apparatus wherein liquid was fed to three blunt end syringe needles with 0.5 mm inside diameter from a cylindrical 1 cm diameter manifold. The liquid filament from each needle was drawn down in diameter by application of a high velocity air jet at or below the needle exit, and the filament was captured on a moving substrate 25 cm below the needle exits, and dried in an oven. This process produced a discontinuous but connected coating of PSA filaments that contacted the substrate in random orientation. By increasing the liquid flow rate at fixed substrate speed, or by decreasing the substrate speed at fixed liquid flow rate, the fraction of surface covered by the mat of PSA filaments was increased. In contrast, a coating of discrete droplets was found to result from the use of the filament forming apparatus with a latex B formulation having no PEO.

Example 12

Filament Formation

A composition of latex B and PEO prepared as described in EXAMPLE 11 was pumped to the apparatus described in EXAMPLE 11 except that the needle exits were in close proximity to a moving substrate. The liquid filaments exiting each needle were drawn down in diameter by tension imparted on the filament by the substrate which moved with larger velocity than the mean velocity of liquid at the needle exit, thus producing a discontinuous PSA coating of co-linear stripes which was then dried in an oven.

Example 13

Slot Coating

Latex B prepared as described in EXAMPLE 2 was mixed using the method described in EXAMPLE 1 with a 200 ppm 8,000,000 MW PEO stock solution diluted from a 5000 ppm stock solution prepared as described in EXAMPLE 1 in an amount sufficient to give 2 ppm PEO in the composition. Coating experiments were performed using this composition as well as latex B without PEO in which liquid was pumped at 0.21 cc/cm-sec to a standard slot coating die with slot dimensions 250 microns high by 13 cm wide. Vacuum was applied to the upstream side of the die by means of a vacuum box, and the coating gap was adjusted from large to small until continuous coating was observed. TABLE 10 provides results for each liquid wherein relative to the latex formulation (i.e., without PEO), continuous coating of the latex/

PEO composition was achieved at higher coating speeds and wider coating gap.

TABLE 10

Observed coatings for slot coating latex PSA with and without PEO

| PEO concentration (ppm) | Coating Gap (micron) | Coating Speed (m/min) | Observed Coating |
|---|---|---|---|
| 0 | 250 | 12 | continuous |
| 0 | 250 | 18 | rivulets |
| 0 | 75 | 30 | rivulets |
| 2 | 305 | 37 | continuous |

Example 14

Microsphere Preparation

A composition of microsphere PSA suspension and 500 ppm 8,000,000 MW PEO was prepared as described in EXAMPLE 3, and was used in slot coating experiments with slot dimensions 250 microns high by 3 cm wide, no vacuum applied to the upstream side, and a die to substrate gap of 500 microns. Continuous coating was observed for a liquid flow rate of 0.11 cc/cm-sec and substrate speed from 6 to 31 m/min. For the PSA microsphere suspension at 0 ppm PEO using the same apparatus and coating gap, with a substrate speed of 6 m/min, a liquid flow rate of 0.33 cc/cm-sec was required to achieve a continuous coating.

What is claimed is:

1. A coating composition comprising a water-based pressure-sensitive adhesive formulation, and a polymer additive comprising poly(ethylene oxide) polymers having a molecular weight of at least about 1,000,000 g/mole, wherein the polymer additive is present at a concentration between about 1 ppm and about 50 ppm, based on the weight of the composition, the concentration being suitable to allow the composition to be delivered from the coating die of a premetered coater in the form of a stable sheet at a flow rate substantially less than the minimum delivery flow rate achievable using the formulation itself.

2. A composition according to claim 1 wherein the composition maintains a stable curtain at a minimum flow rate that is less than 70% of the minimum flow rate necessary to maintain a stable curtain in a curtain coater of the formulation without added polymer.

3. A composition according to claim 2 wherein the composition maintains a stable curtain at a minimum flow rate that is less than 50% of the minimum flow rate necessary to maintain a stable curtain in a curtain coater of the formulation without added polymer.

4. A composition according to claim 1 wherein the premetered coater is a slot coater and the composition permits a stable sheet to be delivered at a gap distance of on the order of twice the maximum gap distance useful for delivering the corresponding formulation, without additive, in the form of a stable sheet.

5. A composition according to claim 1 wherein the adhesive formulation comprises a latex, acrylate-based PSA.

6. A composition according to claim 1 wherein the adhesive formulation comprises a water-based latex pressure sensitive adhesive and the polymer comprises between about 1 ppm and about 50 ppm high molecular weight PEO.

7. A method of preparing a coating composition, the method comprising the steps of:

(a) forming a water-based pressure-sensitive adhesive formulation, and (b) adding, during or after formation of the formulation, a polymer additive comprising poly(ethylene oxide) polymers having a molecular weight of at least about 1,000,000 g/mole to yield a final concentration suitable to allow the composition to be delivered from the coating die of a premetered coater in the form of a stable sheet at a flow rate substantially less than the minimum delivery flow rate achievable using the formulation itself.

8. A method according to claim 7 wherein the polymer is added to a concentration of between about 1 ppm and about 50 ppm.

9. A coating composition prepared by the method of claim 7.

10. A coated substrate comprising a composition of claim 1 provided in the form of a stable sheet.

11. A filament formed from the composition of claim 1.

12. A coating composition according to claim 1 wherein the adhesive formulation is provided in the form of adhesive microspheres.

13. A method of preparing a coating composition, the method comprising the step of adding to a water-based pressure-sensitive adhesive formulation a additive comprising poly(ethylene oxide) polymers having a molecular weight of at least about 1,000,000 g/mole to yield a final concentration suitable to allow the composition to be delivered from the coating die of a premetered coater in the form of a stable sheet at a flow rate substantially less than the minimum delivery flow rate achievable using the formulation itself.

14. A coating composition comprising a water-based pressure-sensitive adhesive formulation selected from the group consisting of acrylate-based pressure sensitive adhesives, and a polymer additive comprising one or more high molecular weight polymers, wherein the polymer additive comprises poly(ethylene oxide) polymers and is present at a concentration between about 1 ppm and about 50 ppm, the concentration being suitable to allow the composition to be delivered to a substrate from the coating die of a premetered coater in the form of a stable sheet at a flow rate substantially less than the minimum delivery flow rate achievable using the formulation alone.

15. A coated substrate comprising a composition of claim 14 provided in the form of a stable sheet.

16. A method of preparing a composition for coating a substrate, the method comprising the steps of:

(a) forming a water-based pressure-sensitive adhesive formulation selected from the group consisting of acrylate-based pressure sensitive adhesives, and (b) adding, during or after formation of the formulation, a high molecular weight polymer additive comprising one or more high molecular weight polymers, comprising poly(ethylene oxide) polymers, to yield a final concentration between about 1 ppm and about 50 ppm, the concentration being suitable to allow the composition to be delivered to the substrate from the coating die of a premetered coater in the form of a stable sheet at a flow rate substantially less than the minimum delivery flow rate achievable using the formulation itself.

17. A coating composition prepared by the method of claim 16.

* * * * *